United States Patent
van den Brenk et al.

(10) Patent No.: US 9,894,923 B2
(45) Date of Patent: Feb. 20, 2018

(54) PROCESS FOR THE PRODUCTION OF A POWDERED COMPOSITION, THE POWDERED COMPOSITION OBTAINED THEREBY AND USES THEREOF

(75) Inventors: Joep van den Brenk, Den Bosch (NL); Johan Michiel Adriaan Bosman, Wageningen (NL); Geertje Katrien Huijs, Wageningen (NL)

(73) Assignee: N.V. NUTRICIA, Zoetermeer (NL)

( * ) Notice: Subject to any disclaimer, the term of this patent is extended or adjusted under 35 U.S.C. 154(b) by 54 days.

(21) Appl. No.: 14/008,148

(22) PCT Filed: Mar. 30, 2012

(86) PCT No.: PCT/EP2012/001412
§ 371 (c)(1),
(2), (4) Date: Sep. 27, 2013

(87) PCT Pub. No.: WO2012/130468
PCT Pub. Date: Oct. 4, 2012

(65) Prior Publication Data
US 2014/0023772 A1    Jan. 23, 2014

(30) Foreign Application Priority Data
Mar. 31, 2011 (WO) ................. PCT/EP2011/001633

(51) Int. Cl.
*A23L 1/30* (2006.01)
*A23L 1/305* (2006.01)
(Continued)

(52) U.S. Cl.
CPC ............. *A23L 1/3006* (2013.01); *A23C 1/04* (2013.01); *A23K 20/147* (2016.05);
(Continued)

(58) Field of Classification Search
CPC ......... A23C 1/04; A23L 1/0035; A23L 1/296; A23L 1/30; A23L 1/3002; A23L 1/3056; A23L 1/3006; A23L 3/46; A23K 1/001; A23K 1/002; A23K 1/1631; A23K 1/164; A23K 1/1643
(Continued)

(56) References Cited

U.S. PATENT DOCUMENTS 4,141,783 A    2/1979  Pisecky et al.
4,280,851 A *  7/1981  Pitchon et al. ................. 127/33
(Continued)

FOREIGN PATENT DOCUMENTS

EP    2 123 164 A1    11/2009
GB      198 496 A      6/1923
WO    01/33971 A1     5/2001

OTHER PUBLICATIONS

International Search Report and Written Opinion from PCT/EP2012/001412, dated May 3, 2012.

*Primary Examiner* — Emily Le
*Assistant Examiner* — Subbalakshmi Prakash
(74) *Attorney, Agent, or Firm* — Stephen T. Olson; Harness, Dickey & Pierce, P.L.C.

(57) ABSTRACT

The present invention relates to a process for the production of a powdered composition from a liquid composition comprising fat, protein or both, to the powdered composition obtained thereby and products containing said powdered composition.

21 Claims, 4 Drawing Sheets

Figure 1:
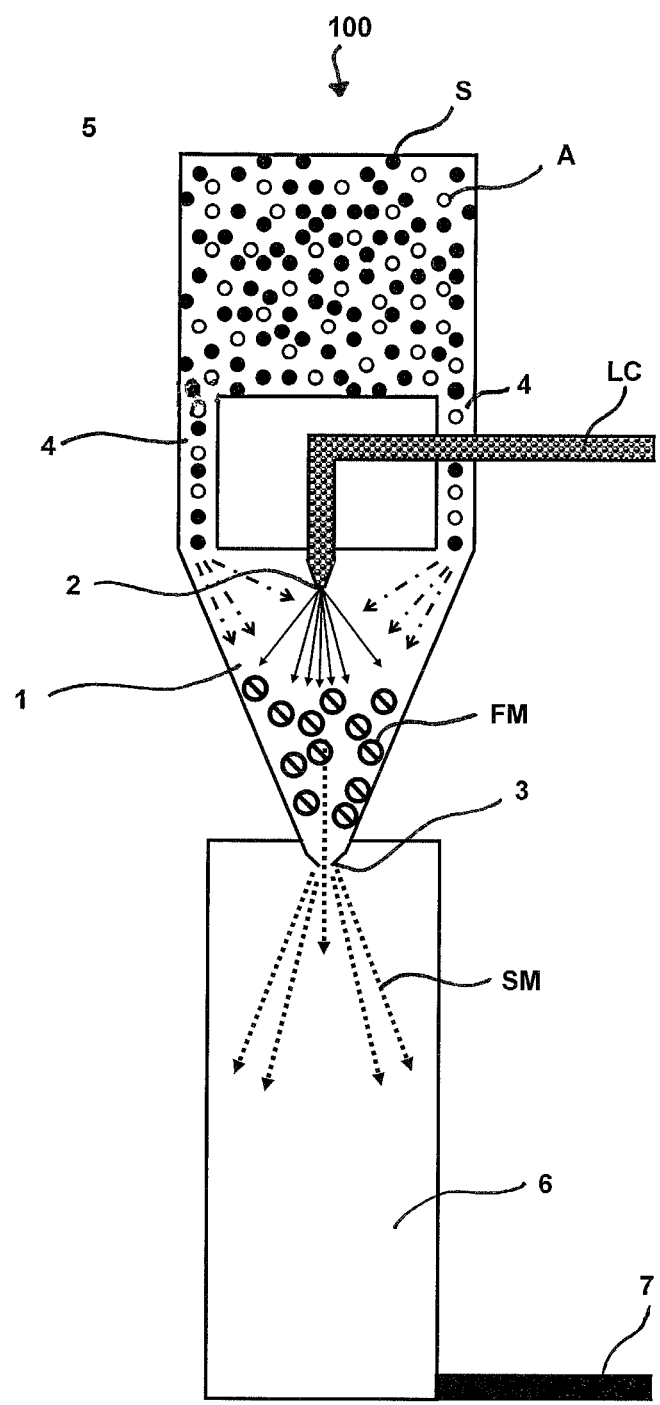

(51) Int. Cl.
*A23C 1/04* (2006.01)
*A23L 3/46* (2006.01)
*A23K 40/00* (2016.01)
*A23K 40/10* (2016.01)
*A23K 20/147* (2016.01)
*A23K 20/158* (2016.01)
*A23K 20/163* (2016.01)
*A23P 10/40* (2016.01)
*A23L 33/00* (2016.01)
*A23L 33/10* (2016.01)
*A23L 33/105* (2016.01)
*A23L 33/115* (2016.01)
*A23L 33/19* (2016.01)

(52) U.S. Cl.
CPC ........ *A23K 20/158* (2016.05); *A23K 20/163* (2016.05); *A23K 40/00* (2016.05); *A23K 40/10* (2016.05); *A23L 3/46* (2013.01); *A23L 33/10* (2016.08); *A23L 33/105* (2016.08); *A23L 33/115* (2016.08); *A23L 33/19* (2016.08); *A23L 33/40* (2016.08); *A23P 10/40* (2016.08)

(58) Field of Classification Search
USPC .................................................. 426/601, 648
See application file for complete search history.

(56) References Cited

U.S. PATENT DOCUMENTS

| | | | |
|---|---|---|---|
| 4,610,760 A * | 9/1986 | Kirkpatrick et al. | ........ 159/4.01 |
| 2005/0095339 A1* | 5/2005 | Carver | ................ A23L 1/05223 |
| | | | 426/589 |
| 2008/0187635 A1* | 8/2008 | Meister | ......................... 426/311 |
| 2010/0092635 A1 | 4/2010 | Van Seeventer et al. | |

* cited by examiner

PROCESS FOR THE PRODUCTION OF A POWDERED COMPOSITION, THE POWDERED COMPOSITION OBTAINED THEREBY AND USES THEREOF

CROSS-REFERENCE TO RELATED APPLICATIONS

This application is the US National Stage (371) of International Application No. PCT/EP2012/001412, filed Mar. 30, 2012, which claims priority to International Application No. PCT/EP2011/001633, filed Mar. 31, 2011. The disclosures of each are herein incorporated by reference in their entirety.

FIELD

The present invention relates to a process for the production of a powdered composition from a liquid composition comprising fat, protein or both, to the powdered composition obtained thereby and products containing said powdered composition.

BACKGROUND OF THE INVENTION

The use of spray-drying is a known method for the production of powdered compositions, such as powdered nutritional formulas. Different processes are known for preparing such spray-dried products. Prior art processes are for instance described in Food Product Design (May 1997): "Spray drying: innovative use of an old process" by R. C. Deis. WO 94/28993 A1 discloses a modified drying process using superheated steam in the drying medium.

NL 8602710 discloses a method for producing a food product in powder form whereby a starch-containing starting material present in form of a slurry is steam heated and dried and whereby the slurry is dispersed by steam injection.

However, it is still a continuous aim to increase the production capacity for powdered nutritional formulas, for example infant milk formulas. An increased capacity will allow a factory to produce more powder and to reduce the production cost per quantity of produced powder. However, increasing the process capacity regularly results in negative side effects. Negative side effects very often include a decreased quality of the powder. For example, infant formula powder should have a good wettability, that means a short time that powder stays on the surface of water before dissolving, a limited amount of white flecks, which are protein precipitates visible on the inside of a milk bottle after emptying, and a good bulk density. A reliable and reproducible bulk density in the process is particularly important as preparing a nutrition from a powdered composition is usually done by adding a predefined volume of a powdered composition to a liquid. For example, for infant nutrition usually a given number of scoops per bottle is added. Deviations in bulk density of the powder can disturb the concentration of nutrients or nutrient requirements of the infant.

Furthermore, the negative effects of heat should be limited, i.e. the occurrence of Maillard reaction products should be limited since Maillard reaction products are undesired in the powder.

Thus, a technical problem underlying the present invention is to provide methods and means for overcoming the disadvantages associated with the processes in the state of the art.

A further technical problem underlying the present invention is to provide cost-effective methods to produce with an increased production capacity powdered compositions, especially powdered compositions containing fat, protein and carbohydrates, for instance powdered nutritional formulas, with high quality.

A further technical problem underlying the present invention is to provide powdered compositions, especially powdered compositions containing fat, protein and carbohydrates, which exhibit improved properties, in particular improved technological, functional and/or organoleptic properties and methods to produce them.

SUMMARY OF THE INVENTION

The present inventors have found a way to increase the production capacity of the powder production process, while maintaining good or even improved powder characteristics. Accordingly, the present invention provides for a process for the production of a powdered composition, in particular powdered nutritional product, from a liquid composition, using a spray-drying process wherein both air and steam, preferably in form of a mixture thereof, are used to atomize a liquid composition.

A particular contribution of the present invention to the art is the increase of production capacity of powders by feeding a highly concentrated liquid composition in the powder manufacturing process, while retaining good powder characteristics. Obviously, production capacity can also be increased by scaling up a manufacturing process—that means this increases the weight of powder that can be produced. However, this is not cost effective as also the weight of water that has to be evaporated increases. Hence, in the art it is highly desirable to increase production capacity by increasing the dry matter concentration of the liquid composition.

The present invention solves its technical problem in particular by providing the subject matter of the claims and especially by providing a method according to claim 1.

In the present process, a liquid composition, preferably a concentrated liquid mixture, from which for instance infant formula powder is manufactured, is fed through an inlet nozzle, preferably a pressure nozzle, into a mixing chamber comprising gas, in particular air, and steam, thereby atomizing the liquid mixture. Preferably, in the mixing chamber itself, no drying process takes place. This first atomization step is followed by a second atomization step, wherein the atomized mixture of liquid composition, steam and gas, in particular air, exits the mixing chamber through an outlet nozzle. In a preferred embodiment, the mixture can exit the mixing chamber into a drying chamber, for instance a spraying tower, wherein the composition is dried, resulting in a powder. A main benefit of the present process is the increase of the production capacity of the process, since the solids content of the liquid composition can be very high, resulting in an improved production capacity, while the resulting powder displays very particular and advantageous characteristics. Furthermore, the present process allows a reliable, controllable and reproducible production of powder with desired properties, in particular bulk density.

The present inventors first recognized that using a first atomisation step wherein 100% steam is introduced into the mixing chamber is not sufficient to provide a production capacity increased process for obtaining high quality powder. In fact, steam is usually introduced for quickly heating the liquid composition by condensation of the steam onto the atomized liquid composition. The temperature increase of the liquid composition improves the atomisation of the liquid composition. However, using 100% steam results in undesired powder quality, for example due to undesirable Maillard reactions caused by overheating. Additionally, atomizing with 100% steam results in significant amounts of condensed steam, which in turn needs to be evaporated in a drying chamber. The evaporation of water requires extra energy, thereby increasing costs and reducing capacity of the powder manufacturing process. Furthermore, a high humidity in the drying chamber causes fouling of the chamber resulting in decreased capacity.

On the other hand, using 100% air does not give the desired result either. In particular, the resulting powder does not have the desired quality, for example displays a variable bulk density. Furthermore, the production capacity of the process is too low. Without wishing to be bound by theory, the reduced production capacity and/or product quality is believed to be due to the lack of a non-evaporative zone in the mixing chamber, when using air only. The outside of a forming droplet dries very quickly, forming a small "crust" around at least a part of the droplet, thereby disturbing the atomization of the product. When the non-evaporative zone is lacking, the surface of the droplet increases in viscosity, thereby impairing atomisation.

DETAILED DESCRIPTION

Thus, the present invention solves its technical problem in particular by a process for the production of a powdered composition from a liquid composition comprising fat, protein or both, which process comprises: a) a first atomising step, wherein the liquid composition and (i) gas and steam or (ii) a mixture of gas and steam are fed into a mixing chamber and wherein the feeding of liquid composition is conducted by spraying it through an inlet nozzle into the mixing chamber so as to obtain a first mixture, b) a second atomising step, wherein the first mixture exits said mixing chamber through an outlet nozzle, so as to obtain a second mixture and c) drying the second mixture so as to obtain the powdered composition.

In the context of the present invention a "liquid composition" is meant to refer to a fluid medium, preferably an aqueous fluid medium, as a first component, comprising a second component, namely fat, protein or both, that means fat and protein. Said liquid composition may be in the form of a solution, suspension or emulsion. Preferably, the liquid composition comprises protein, fat, carbohydrates, vitamins and minerals. Preferably, the liquid composition comprises long chain polyunsaturated fatty acids, preferably docosahexaenoic acid (22:6; n-3), more preferably docosahexaenoic and arachidonic acid (20:4; n-6), more preferably fish oil. It was found that the present process can be advantageously used to manufacture a powder with such oils.

The liquid composition is preferably an emulsion.

In the context of the present invention the term "comprising" is meant to have the same meaning as "containing" or "including". The present liquid composition preferably also contains carbohydrates. In one embodiment, however, the term "comprising" is also understood to have the meaning of "consisting of", hereby excluding the presence of further components in said composition.

In the context of the present invention a "powdered composition" refers to a composition composed of particles, in particular fine particles, in particular those which are not cemented together. Thus, a composition in powder form is a composition in a particle form.

In the present invention the term "nozzle" refers to a mechanical device able to control the direction and/or characteristics of a fluid flow, in particular of a liquid composition, as it exits or enters an adjacent chamber or pipe via an orifice. In the context of the present invention the term "nozzle" does not include said adjacent chamber or adjacent pipe, but solely refers to the control device comprising the orifice.

According to the process of present invention, the inlet nozzle is preferably a pressure nozzle or prefilming nozzle, preferably pressure nozzle. The outlet nozzle is preferably a two fluid nozzle.

In a furthermore preferred embodiment of the present invention the nozzle is a pressure nozzle, in particular a single fluid pressure nozzle, preferably an atomizer nozzle.

"Steam" is according to the present invention a mist or gas phase of water, that means water vapour. In the present process, preferably the gas phase of water is used. Preferably, superheated steam is used. Superheated steam is steam at a temperature higher than its boiling point at a given pressure. Preferably, the steam consists of gasiform or misty water. Preferably, the steam is pure steam, in particular steam which is free of air. The steam can also be saturated steam, that means steam which is in equilibrium with liquid water.

The gas used in the present process is preferably air, an inert gas or a mixture thereof, preferably air or nitrogen or a mixture thereof, most preferably air. The present inventor found that even with air, the present process gives a high capacity and good powder characteristics. The term "air" as used in the present invention refers to a gaseous mixture, comprising nitrogen, oxygen and argon. Preferably, the present process uses the air as present in the earths atmosphere comprising about 78 volume % nitrogen and 21 volume % oxygen and about 1 volume % other substances including argon and carbon dioxide.

The terms "atomization" and "atomizing" as used in the present invention refers to separating a liquid composition into particles, preferably the separation occurs mainly by (i) shear; and/or (ii) turbulence resulting from a gas flow.

In the context of the present invention the equilibrium temperature preferably is the thermal equilibrium temperature and is meant to refer to the temperature of a system comprising at least two components being in thermal contact with each other and wherein there is no net exchange of energy between the components resulting in a single system, wherein each of the components have the same temperature, meaning that the whole system has a single temperature.

In the mixing chamber, the liquid composition is mixed with steam and gas, preferably air. The liquid composition is fed into the mixing chamber via an inlet nozzle, preferably a pressure nozzle. The introduction or feeding of the liquid composition under pressure through a nozzle results in a first atomization of the liquid composition.

The present process is preferably an industrial process, and is preferably adapted for that. In the present process, preferably, the liquid composition is sprayed into the mixing chamber at a flow-rate from 250 to 700 kg/hour.

The gas, preferably air, and the steam can be fed into the mixing chamber in combination or separately from each other. In a preferred embodiment, the steam and the gas, preferably air, is fed into the mixing chamber separately from each other, so that the settings of the mixing process can be favourably controlled. Preferably, the steam and the gas, preferably air and steam, can be fed together into the mixing chamber, preferably in form of a mixture.

In a preferred embodiment of the present invention, steam and gas, preferably air, is fed separately from each other into the mixing chamber and separately from the liquid composition.

In a preferred embodiment of the present invention, steam and gas, preferably air, is fed in combination into the mixing chamber and separately from the liquid composition.

In a preferred embodiment of the present invention specific ratios of gas, preferably air, to steam in the gas-steam mixture, preferably air-steam mixture, present in the mixing chamber result in a particularly high production capacity of the process, while retaining a particularly good powder quality of the resulting product. This is believed to be due to the good equilibrium temperature (Tequi) in the mixing chamber and/or the reduced need to evaporate water, while having sufficient steam for good heat transfer to the particles by condensation of the steam and the formation of a non-evaporative zone.

Preferably, the weight ratio of gas:steam, preferably air:steam, present in the mixing chamber is from 1:0.5 to 1:25, measured as weight per time segment, for example measured as weight per hour. More preferably, the weight ratio of gas:steam, preferably air:steam, present in the mixing chamber is from 1:1 to 1:20, and even more preferably from 1:1 and 1:15, measured as weight per time segment. Preferably, the weight ratio of gas:steam, preferably air:steam, present in the mixing chamber is from 1:5 to 1:15, measured as weight per time segment, for example around 1:8.

The weight ratio of gas:steam:liquid composition, preferably air:steam:liquid composition, present in the mixing chamber is preferably 0.5 to 5 (gas, preferably air):2 to 15 (steam):100 (liquid composition) (weight/hour).

The liquid composition has preferably a temperature from 55 to 90° C. when sprayed into the mixing chamber. This enables a particularly good atomization.

It was found that the gas, preferably air, and steam feed are preferably be arranged so that the equilibrium temperature in the mixing chamber is below 159° C., preferably below 155° C., more preferably below 150° C., preferably the equilibrium temperature in the mixing chamber is at least 100° C., more preferably at least 120° C. Preferably, the equilibrium temperature in the mixing chamber is from 90° C. to 155° C. More preferably, the equilibrium temperature in the mixing chamber is from 100° C. to 155° C., even more preferably from 120° C. to 155° C., even more preferably from 125° C. to 150° C.

The equilibrium temperature in the mixing chamber can for example be from around 125° C. to around 155° C.

This provides a good powder quality, while keeping heat damage limited. Heat damage can be measured for example by the determination of the white fleck number.

The liquid composition according to the present invention comprises fat, protein or fat and protein. The liquid composition can additionally comprise carbohydrates. The liquid composition comprises preferably fat, protein and carbohydrates.

Preferably, the liquid composition has a dry matter content of at least 55 weight %, more preferably of at least 60 weight %, even more preferably of at least 62 weight %.

Preferably, the liquid composition has a dry matter content from 55 to 75 weight % (based on total weight of the liquid composition). Preferably the liquid composition has a dry matter content from 55 to 70 weight % based on total weight of the liquid composition, more preferably from 58 to 65 weight %. Preferably, the liquid composition has a dry matter content from 60 to 75 weight % (based on total weight of the liquid composition), more preferably from 60 to 69 weight %, for example of around 65 to around 67 weight %.

The highly concentrated liquid composition with a preferred dry matter content from 55 to 70 weight % preferably results in an increase of the production capacity of factory by about 5 to 40%. Spray drying of a liquid composition comprising for instance protein, fat and carbohydrates can be used to obtain a powder providing nutrition to a subject, preferably after dissolving it in a liquid such as water. The liquid composition, preferably, comprises 20 to 35, preferably 22 to 32 wt % fat based on dry weight of the liquid composition, i.e. without the water. The liquid composition preferably comprises 10 to 25, preferably 17 to 22 wt % protein based on dry weight of the liquid composition. The liquid composition has preferably a fat content of 20 to 35 weight % (based on dry weight of the liquid composition) and a protein content of 10 to 25 weight % (based on dry weight of the liquid composition).

It was also found that the length of the mixing chamber is preferably limited. With a long mixing chamber, a unexpected pulsating behaviour can occur, which can make it more difficult to properly dry the product for example in a drying chamber and potentially results in a powder of reduced and inconsistent quality. The mixing chamber for use in the present invention, preferably, has a length of 2 to 10 cm, preferably 3 to 8 cm.

The pressure in the mixing chamber is preferably from 2 to 10 bar, more preferably from 5 to 7 bar. Such a preferred pressure in the mixing chamber ensures the ability to introduce steam at the proper temperature and a good atomization when the mixture of air, steam and liquid composition exits the mixing chamber through an outlet nozzle to obtain a second mixture.

After the second atomizing step, wherein the heated first mixture exits the mixing chamber through an outlet nozzle, so as to obtain a second mixture, the second mixture is dried, preferably fully dried, to obtain the powdered composition. For drying conventional drying methods may be used, for example using a drying air flow in a drying chamber.

In a preferred embodiment of the present invention, the drying air flow may be a co-current, a counter-current or a mixed air flow.

In a preferred embodiment the dried product is removed from the drying air and preferably is collected in collection equipment.

In a furthermore preferred embodiment the dried product may be subjected to further processing steps such as agglomeration leading to agglomerated products which in turn may also be dried.

The process according to the present invention results in a powder displaying a good quality, preferably with properties distinguishing the present powder from powder of the state of the art.

Therefore, the present invention refers also to a powdered composition obtainable according to the process according to the present invention.

For a powdered composition, for example a nutritional powdered composition, it is important that it has a reproducible bulk density. It was found that with the present process a powder composition with a reliable, controllable and/or reproducible bulk density can be manufactured. This is very important, particularly for infant nutrition powders. Infant nutrition is usually made by reconstitution of a powder using a scoop. With a variable bulk density, the weight per scoop can vary, resulting in an inaccurate dosing of the powder, and the feeding of a suboptimal formula. Hence, maintaining a reliable bulk density is important in the art.

The powdered composition preferably comprises fat, protein or fat and protein, preferably the powdered composition comprises fat and protein and carbohydrates.

Preferably, the powdered composition has a bulk density of less than 0.54 g/ml, more preferably of less than 0.50 g/ml. Preferably, the powdered composition has a bulk density of more than 0.45 g/ml, more preferably of at least than 0.47 g/ml. Preferably, the powdered composition has a bulk density of 0.35 to 0.51 g/ml. Preferably, the powdered composition has a bulk density of 0.40 to 0.6 g/ml, more preferably of 0.45 to 0.55 g/ml, even more preferably of 0.47 to 0.53 g/ml, even more preferably of 0.47 to 0.50 g/ml.

In the context of the present invention, D [v, 0.5] is the volume (v) median diameter also referred to as D50 or D0.5 that means is the diameter value of the particle size in a given particle population, where the diameter of 50% of the particles in the population is below this value and 50% is above the value.

In the context of the present invention, the D [v, 0.1] is the diameter value of the particle size in a given particle population, where the diameter of 10% of the particles in the population is below this value and 90% is above the value.

In the context of the present invention, D [v, 0.9] is the diameter value of the particle size in a given particle population, where the diameter of 90% of the particles in the population is below this value and 10% is above the value.

In the context of the present invention, D [4.3] is the volume or mass moment mean or the De Broucker mean, in particular the volume mean. The D [4.3] value is the arithmetic average of the particle population.

The powdered composition has preferably a particle size distribution D [4.3] which is in the range from 80 to 350 μm, in particular 130 to 220 μm. The powdered composition has preferably a particle size distribution D [4.3] of at least 80 μm, preferably at least 100 μm.

The powdered composition has preferably a particle size distribution D [v, 0.1] which is in the range from 30 to 120 μm, preferably 40 to 110 μm.

The powdered composition has preferably a particle size distribution D [v, 0.5] which is in the range from 80 to 320 μm, preferably 110 to 250 μm, more preferably of 130 to 200 μm.

The powdered composition has preferably a particle size distribution D [v, 0.9] which is in the range from 200 to 700 μm, preferably 250 to 600 μm.

The present invention also provides a nutritional product comprising the powdered composition according to the present invention, preferably in an amount of 1 to 100, preferably 20 to 100, in particular 30 to 99, preferably 50 to 95 weight % (weight % based on total weight of nutritional product). The present invention provides also a nutritional product comprising the powdered composition produced in a process according to the present invention.

The nutritional product is preferably a food or feed product. The nutritional product is more preferably a food product. The nutritional product is more preferably an infant nutritional product. The nutritional product comprises fat, protein or fat and protein, preferably the nutritional product comprises fat and protein and carbohydrates.

Preferably, the present liquid composition or powder comprises lactose, preferably at least 75 wt. % lactose based on total weight of the carbohydrates, more preferably at least 90 wt. %.

The present liquid composition and consequently powder composition comprise protein. The term protein according to this invention refers to proteinaceous material, including undenatured and denatured protein, peptides and amino acids. Preferably, the protein is obtained from cow milk. Preferably, the present liquid composition of powder comprises milk protein (e.g. whey protein, casein), preferably whey protein, casein and/or milk protein concentrate, preferably at least 75 wt. % milk protein based on total weight of protein. Preferably, the present liquid composition or powder composition comprises protein hydrolysate, preferably at least 75 wt. % protein hydrolysate based on total weight of the protein. Preferably, the protein hydrolysate is cow milk protein hydrolysate.

Further preferred embodiments are the subject matter of the subclaims.

The invention will be further described by way of the non-limiting examples at the accompanying figures.

It is shown in

Figure 2:
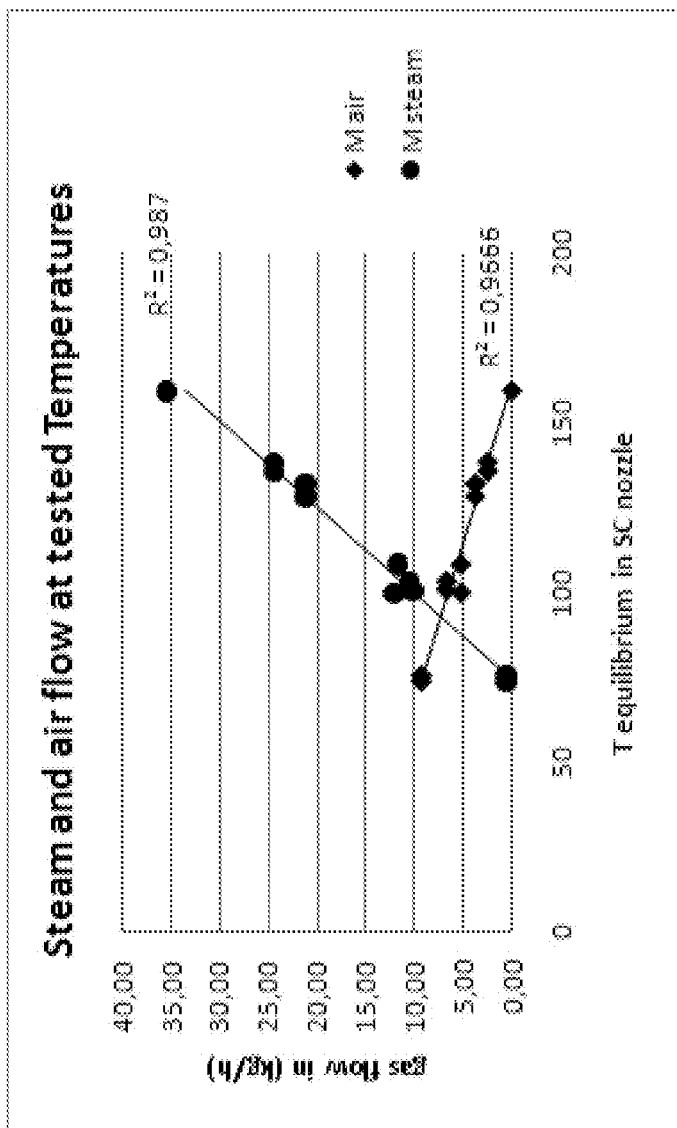
Figure 3:
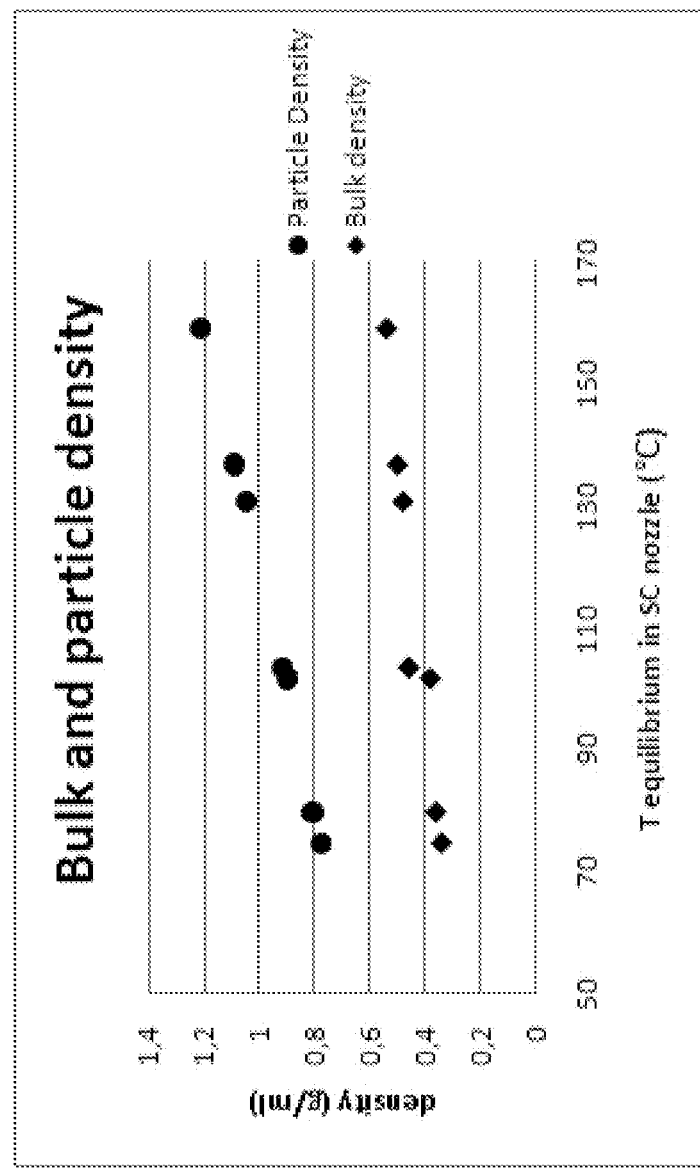
Figure 4:
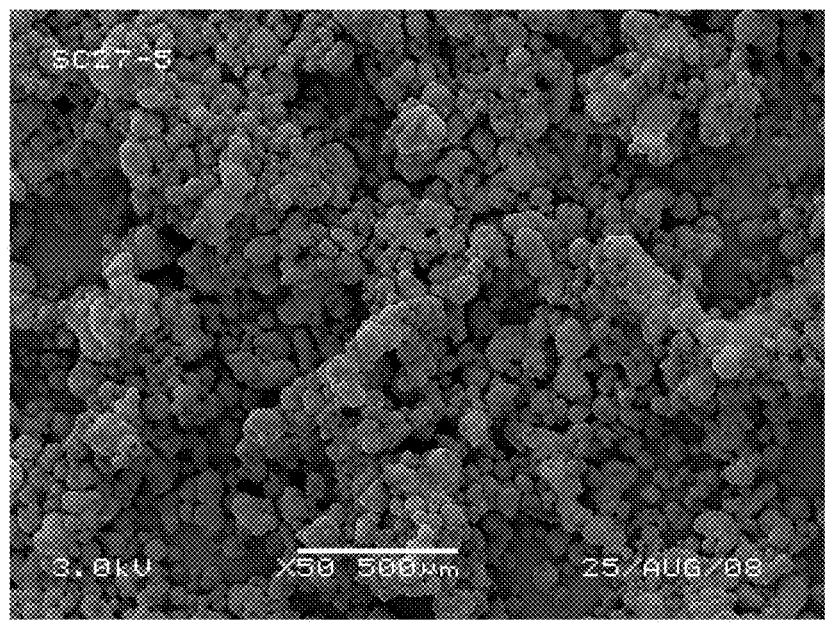
Figure 4:
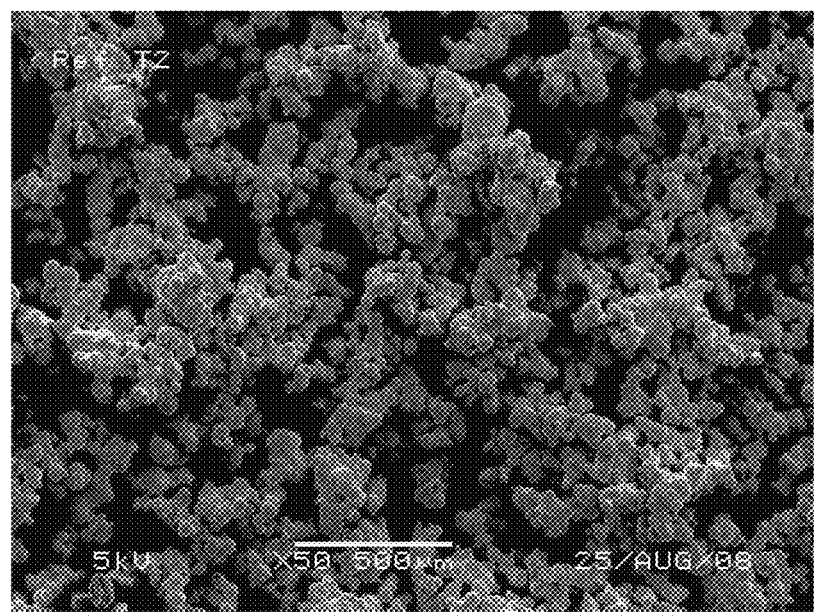

FIG. 1 a schematically overview of the process according to the present invention;

FIG. 2 the steam and air flow at different equilibrium temperatures in the mixing chamber;

FIG. 3 the bulk and particle density of powdered compositions produced according to the present invention and according to the state of the art as function of the equilibrium temperatures in the mixing chamber resulting form different steam/air ratios and FIG. 4 SEM pictures of powdered compositions produced according to the present invention and according to the state of the art.

EXAMPLES

Example 1

FIG. 1 shows a schematically overview over the process according to the present invention. FIG. 1 shows an apparatus 100 to conduct a process according to the present invention. The apparatus 100 comprises a mixing chamber 1, an inlet nozzle 2 and an outlet nozzle 3. Furthermore, the apparatus 100 comprises feed pipes 4 to feed a mixture of steam S and gas, in this example air A from a gas chamber 5 into the mixing chamber 1. The apparatus 100 also comprises a drying chamber 6 for drying a mixture coming through the outlet nozzle 3.

A liquid composition LC comprising fat and protein having a temperature from 55 to 90° C. is sprayed in a first atomizing step through the inlet nozzle 2 into the mixing chamber 1. The mixing chamber 1 is also fed with a mixture of overheated steam and air so that a pressure of 5 to 10 bar, for example around 6 bar, is present in the mixing chamber 1. The steam/air mixture creates a non-evaporative zone, where atomization of the liquid composition sprayed through the inlet nozzle 2 which can be for example a pressure nozzle, into the mixing chamber 1 takes place without simultaneous evaporation. This enables atomization at higher viscosities and thus higher dry matter contents. Therefore, the liquid composition can have for example a dry matter content of around 60 to 68%-weight based on total weight of the liquid composition. The small product droplets resulting from atomization are very quickly heated by condensation of the steam on their surfaces. The driving force for this heat transfer is a temperature difference between the liquid composition and the steam. An equilibrium temperature is reached when the liquid composition has reached the steam temperature, which is determined by the steam pressure in the mixing chamber 1. However, the inventors found that a minimum pressure of around 6 bar in the mixing chamber 1 is helpful to get a good second atomization step using the outlet nozzle 3. However, a pressure of 6 bar would result in a steam saturation temperature of 159° C. when using pure steam. This high temperature can lead to product damage.

When both steam and air are present, the steam saturation temperature depends on the partial steam pressure in the mixing chamber 1, which is proportional to the mole fraction of steam in the steam/air mixture. In the steam/air mixture fed into the mixing chamber 1 the actual amount of air can be very low, but when a large part of the steam condenses in the mixing chamber 1, the mole fraction of steam and air start to approach each other and the partial steam pressure decreases. At the point where the declining saturation temperature of the steam meets the increasing product temperature, the equilibrium temperature is reached and heat transfer stops. This point can be determined from the ingoing flows by iterative calculation, so that the equilibrium temperature is known also when no temperature sensor is present in the mixing chamber 1.

Even a very small fraction of steam in the steam/air mixture still provides a non-evaporative zone, enabling atomization at high dry matter. In tests with water the inventors found that a spray coming out of outlet nozzle 3 using pure air instead of steam is much coarser and contains much larger droplets than when a very small amount of steam is added. This indicates the steam effect on atomization.

By choosing a specific weight ratio of air to steam in the mixing chamber 1 and a specific temperature of the overheated steam a specific equilibrium temperature in the mixing chamber 1 can be set resulting in a specific temperature of the liquid composition present in the mixing chamber 1. Suitable equilibrium temperatures in the mixing chamber 1 can be from 90° C. to 155° C. By spraying the liquid composition through the inlet nozzle 2 into the mixing chamber 1 and heating the sprayed liquid composition to the said equilibrium temperature, a first mixture FM is obtained. This first mixture is sprayed through the outlet nozzle 3. At this point a second atomization takes place. A force is created by the gas accelerating in the exit nozzle further breaking up the first mixture into a fine spray which enters the drying chamber 6. The total mass flow through outlet nozzle 3 is dependent from the pressure in the mixing chamber 1 and the gas mass flow fraction.

By spraying the first mixture through the outlet nozzle 3 a second mixture SM is obtained which can be dried by known means, for example by a heated air flow in the drying chamber 6 resulting in the evaporation of the liquid from the second mixture and the accumulation and shaping of a powdered composition. The powdered composition can be obtained through an outlet 7.

Example 2

The apparatus and process shown in FIG. 1 and described in example 1 is used with following parameters:

The mixing chamber is fed with 21.2 kg/hour steam at a temperature of 164° C. and 3.8 kg/hour air at a temperature of 170° C. A liquid composition having a temperature of 81.1° C. is sprayed into the mixing chamber in an amount of 326 kg/hour. The resulting pressure in the mixing chamber is 6.5 bar. The partial pressure of the steam in the mixing chamber is 5.85 bar. The resulting equilibrium temperature present in the mixing chamber is 132° C.

Example 3

Test of Different Steam/air Ratios

A range of steam/air ratios was tested, starting from 100% air and ending at 100% steam. A liquid composition and process settings as defined in table 1 were used:

TABLE 1 liquid composition and process settings used in the example

| | | |
|---|---|---|
| Fat | % | 28.3 |
| Protein | % | 17.8 |
| pH | | 6.5 |
| Temperature of the liquid composition | ° C. | 78 |
| Flow of the liquid composition | kg/h | 332.0 |
| powder production | kg/h | 228.0 |
| Dry matter content of the liquid composition | % | 67.2 |

The steam, air and composition flows data where registered for each setting and from these values the equilibrium temperature inside the mixing chamber was calculated. The product flow was found to be between 304 and 337 kg/hour and the dry solids concentration of the emulsion was 67%.

FIG. 2 shows the steam and air mass flows plotted at the calculated equilibrium temperatures. In other trials where the equilibrium temperature was not calculated, but measured inside the mixing chamber similar results were found. This strengthens the reliability of using calculations for the determination of the equilibrium temperature.

When approaching 100% steam, as it was used in the state of the art, it was found that it becomes more difficult to dry the powdered composition correctly. The powdered composition got sticky and some lumps were formed at the fluid bed.

FIG. 3 shows that the steam/air ratio has no strong influence on the bulk and particle density of the powdered composition. However, higher equilibrium temperatures lead to higher bulk and particle densities. The explanation of the trend is the fact that at lower temperatures, more air is present in the gas mixture inside the mixing chamber and this air can be incorporated in the product droplets during the second atomization at the outlet nozzle. When using 100% steam there is no air at all present in the chamber. This results in droplets without included air, resulting in higher densities. However, it is visible from FIG. 3 that using the steam/air mixture according to the present invention results also in satisfying bulk and particle densities without the negative side effects occurring when using steam only and the according high temperatures.

Furthermore, the producing rate for the powdered composition is much higher when using a steam/air mixture due to higher dry matter contents being possible in the liquid composition.

Example 4

The process according to the present invention results in a powdered composition with a desired quality which can be produced in increased amounts.

Furthermore, the obtained powdered composition has specific features making it distinguishable from powdered compositions produced by processes according to the state of the art.

FIG. 4 shows SEM pictures of the powdered composition according to the present invention (FIG. 4a) and of a conventional powdered composition (FIG. 4b).

The ivention claimed is:

1. A process for the production of a powdered composition from a liquid composition comprising fat, protein or both, which process comprises:
   a) a first atomizing step comprising:
      i. feeding a mixture of gas and steam into a mixing chamber, and
      ii. feeding the liquid composition into the mixing chamber containing the mixture of gas and steam by spraying the liquid composition through an inlet nozzle into the mixing chamber so as to obtain a mixture,
   wherein the liquid composition is atomized through the inlet nozzle, and
   wherein the mixture of gas and steam creates a non-evaporative zone in which the feeding of the liquid composition into the mixing chamber takes place without simultaneous evaporation,
   b) a second atomizing step, comprising:
      i. spraying the mixture out of the mixing chamber through an outlet nozzle and into a drying chamber, wherein the mixture is atomized through the outlet nozzle and
   c) drying the mixture in the drying chamber, so as to obtain the powdered composition.

2. The process according to claim 1, wherein the gas is air.

3. The process according to claim 1, wherein the liquid composition has a dry matter content from 55 to 70 weight % based on total weight of the liquid composition.

4. The process according to claim 1, wherein the liquid composition has a temperature from 55 to 90° C. when sprayed into the mixing chamber.

5. The process according to claim 1, wherein the weight/hour ratio of gas:steam in the mixing chamber is from 1:0.5 to 1:25.

6. The process according to claim 1, wherein the weight/hour ratio of gas:steam:liquid composition in the mixing chamber is 0.5 to 5:2 to 15:100.

7. The process according to claim 1, wherein the equilibrium temperature in the mixing chamber is from 90 to 155° C.

8. The process according to claim 1, wherein the liquid composition is sprayed into the mixing chamber at a flow-rate from 250 to 700 kg/hour.

9. The process according to claim 1, wherein the mixing chamber has a length of 2 to 10 cm.

10. The process according to claim 1, wherein the pressure in the mixing chamber is 2 to 10 bar.

11. The process according to claim 1, wherein the liquid composition comprises fat, protein and carbohydrates.

12. The process according to claim 1, wherein the liquid composition has a fat content of 20 to 35 weight % based on dry weight of the liquid composition and a protein content of 10 to 25 weight % based on dry weight of the liquid composition.

13. A powdered composition, wherein the powdered composition is obtained according to the process of claim 1.

14. The powdered composition according to claim 13, wherein the powdered composition has a particle size distribution D (v, 0.5) of 80 to 320 μm.

15. The powdered composition according to claim 13, wherein the powdered composition has a particle size distribution D (4.3) of 80 to 350 μm.

16. The powdered composition according to claim 13, wherein the powdered composition has a bulk density of 0.4 to 0.6 g/ml.

17. A nutritional product comprising the powdered composition according to claim 13, where the nutritional product is a food or feed product.

18. The process according to claim 1, further comprising:
   collecting the powdered composition from the drying chamber through a recovery outlet.

19. A process for the production of a powdered composition from a liquid composition comprising fat, protein or both, which process comprises:
   spraying the liquid composition through an inlet nozzle into a mixing chamber containing a mixture of gas and steam having a gas:steam weight ratio of from 1:0.5 to 1:25, wherein the mixture of gas and steam creates a non-evaporative zone in which the spraying of the liquid composition into the mixing chamber takes place without simultaneous evaporation, and wherein the liquid composition is atomized through the inlet nozzle and heated by the mixture of gas and steam to generate a mixture;
   spraying the mixture out of the mixing chamber through an outlet nozzle and into a drying chamber, wherein the mixture is atomized through the outlet nozzle; and
   drying the mixture in the drying chamber to generate the powdered composition.

20. The process according to claim 1, wherein feeding a mixture of gas and steam into the mixing chamber comprises separately feeding the gas and steam into the mixing chamber, the steam having a temperature of 164° C. into the mixing chamber at a rate of 21.2 kg/hour and the air having a temperature of 170° C. into the mixing chamber at a rate of 3.8 kg/hour.

21. The process according to claim 1, wherein the gas comprises about 78 vol. % nitrogen, and about 21 vol. % oxygen.

* * * * *